United States Patent Office 3,530,639
Patented Sept. 29, 1970

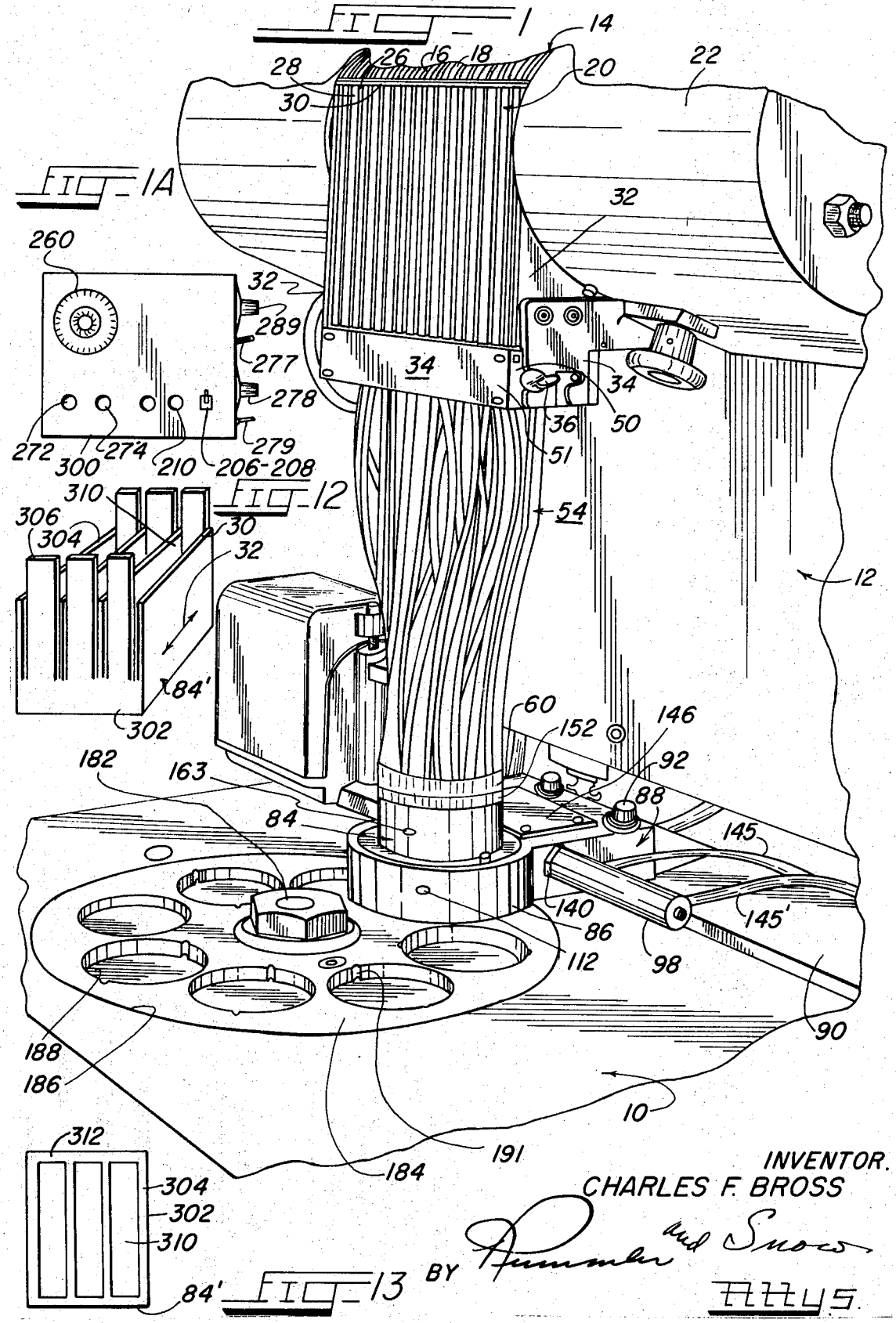

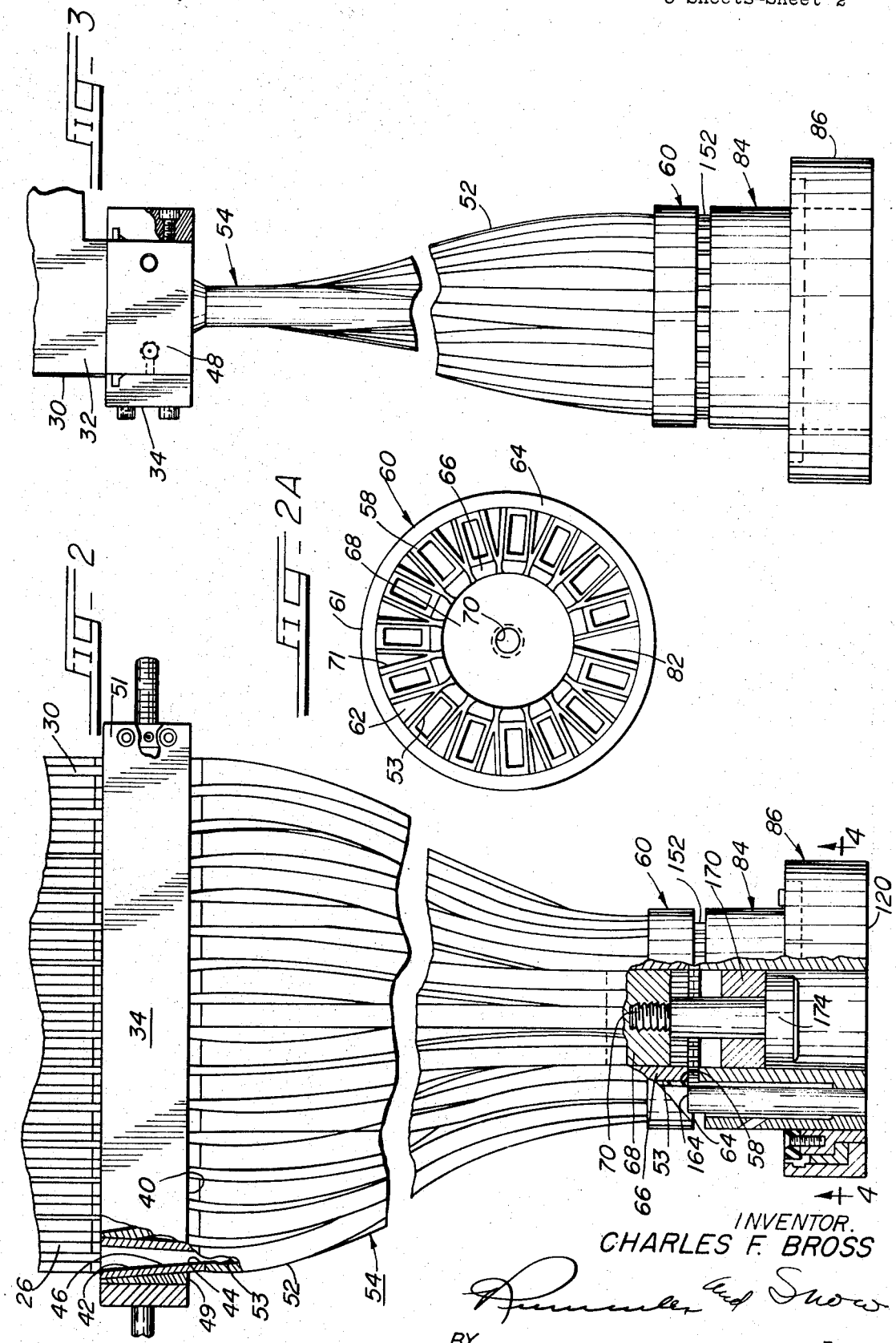

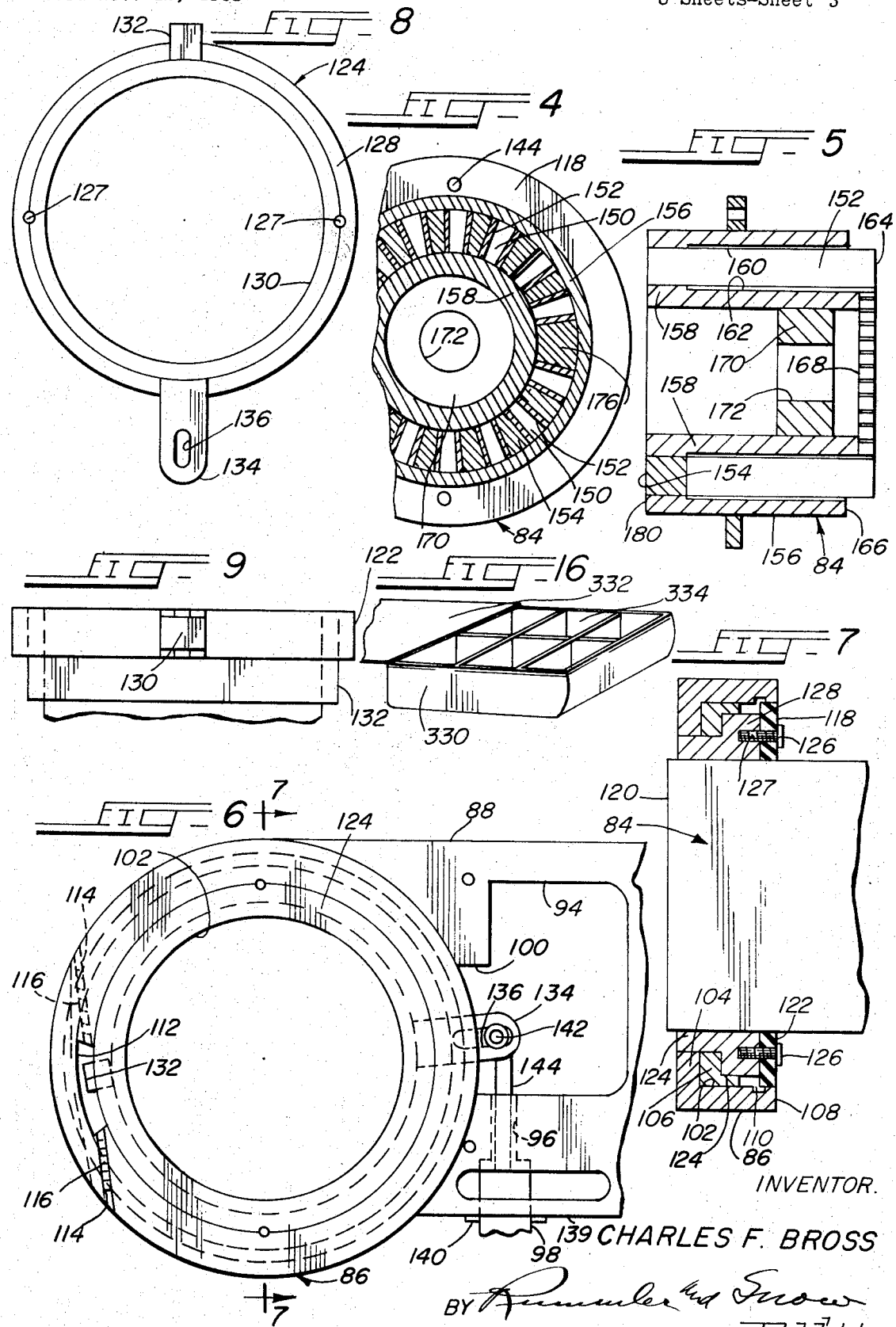

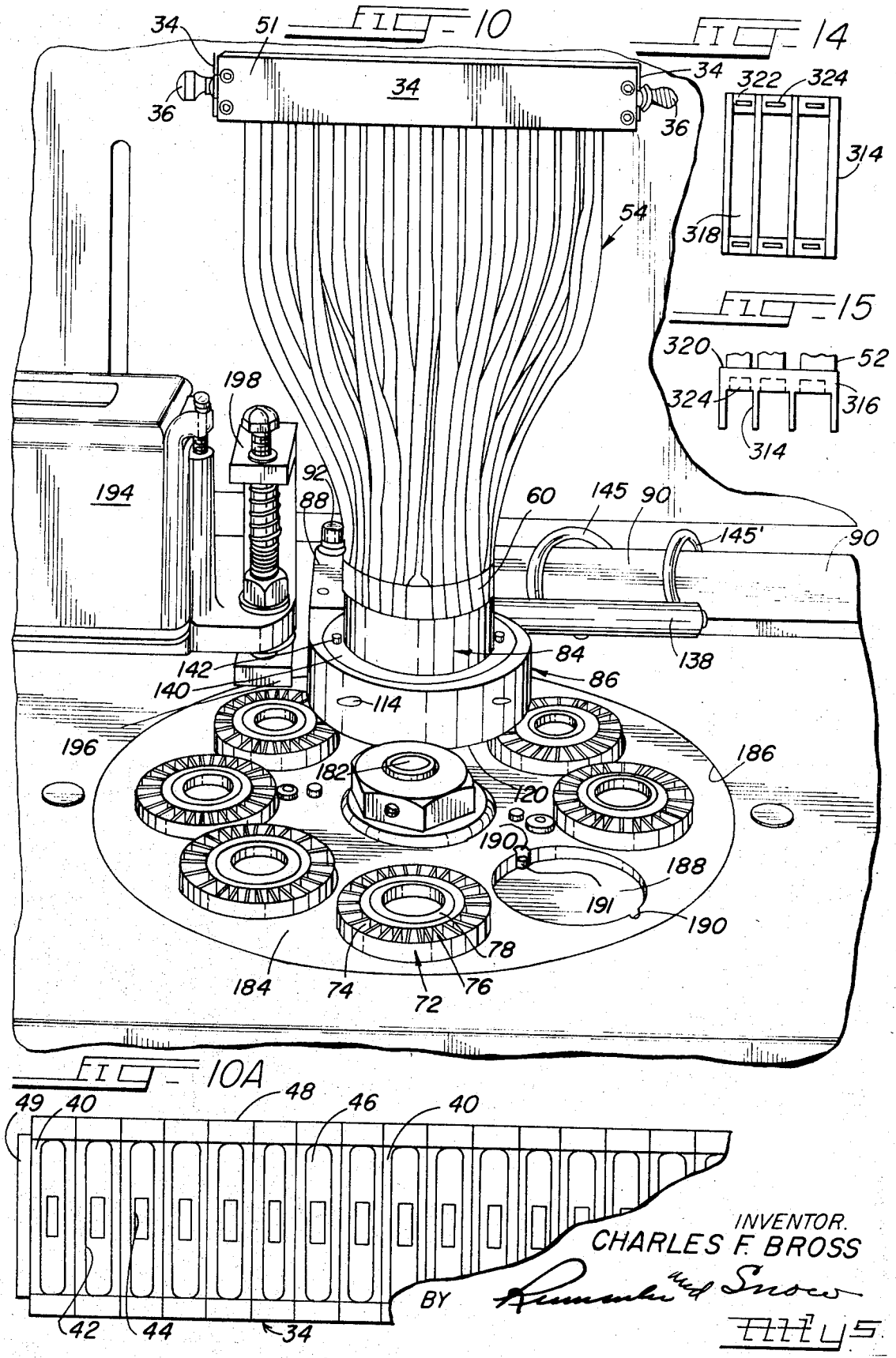

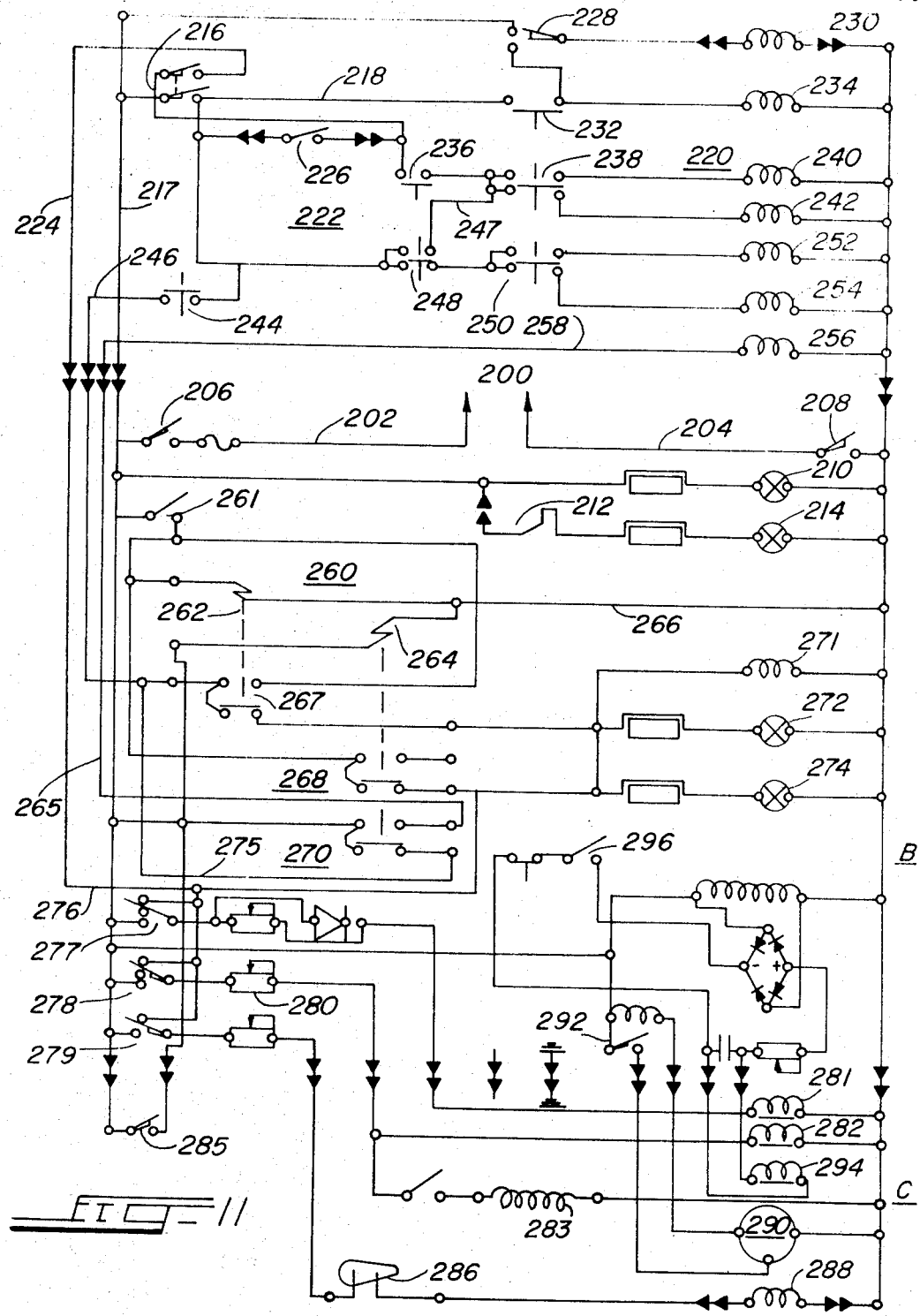

3,530,639
PILL BOX FILLER
Charles F. Bross, Chicago, Ill., assignor to Merrill Machinery Co., Chicago, Ill., a corporation of Illinois
Filed Nov. 12, 1968, Ser. No. 774,815
Int. Cl. B65b 57/20
U.S. Cl. 53—78                                16 Claims

ABSTRACT OF THE DISCLOSURE

This disclosure describes a device for filling compartmented containers such as pill boxes or so-called dial packs and includes a tablet feeding system whereby predetermined numbers of tablets are sequentially conveyed in an oriented line, dropped into an upper manifold having passageways communicating with a lower manifold of fixed tubes through which the tablets pass by gravitational force to a rotary or oscillating ring manifold holding the outlet ends of the tubes in a circular arrangement and communicating with the spaces between flexible, radially and vertically disposed ribs therein into the compartments of a container held in filling position by a rotary container locating plate. Means are included to (1) time the sequential deliveries, (2) orient the container and its compartments with the rotary locating plate and the rotary ring manifold, (3) coordinate the sequential deliveries or discharges of the conveyor with the relative positions of the oscillating ring manifold and the rotating container locating plate to sequentially fill the compartments of the container, (4) to count the number of tablets discharged, and (5) to stop the device without losing count. To operate the device the empty containers are placed in recesses of the locating plate and filled containers are removed from the plate after moving under the oscillating ring manifold. Other embodiments are disclosed.

BACKGROUND OF THE INVENTION

Machines designed to pick up, convey and deliver tablets to a container for packaging purposes are well known in the art. Such devices comprise a hopper containing a supply of tablets, a conveyor to pick up predetermined numbers of tablets in a sequence, a delivery funnel at the discharge end of the conveyor and a container handling table operable to be raised and lowered, so that a container can be placed thereon and raised into receiving position under the delivery funnel. These tablet handling machines function very satisfactorily with a minimum of tablet breakage or malfunction of parts. The machines are made to operate intermittently by hand or can be fully automatic. The container table is adjustable for various sizes of containers or various funnel lengths and is, in one form, raised and lowered by a large hand wheel operating through a gear arrangement and a lift fork attached to the container table.

With the advent of compartmented containers for tablets wherein a predetermined number of tablets must be delivered at precise points to enter the compartments, the previous tablet handling machines proved to be inadequate. Fixed manifold passageways could not be used to fill all types of compartmented containers and each manifold had to be tailor-made for a particular configuration of compartments. The fabrication of the manifolds becomes a matter of considerable expense which is not justified in the end result because there was experienced a considerable amount of tablet breakage. For these reasons, the need arose for a manifold of more flexible design which could be used for both general packaging of tablets and also which could be used to fill compartmented containers, particularly circular containers or dial packs having radially disposed and segmented compartments, and also rectilinear capsule boxes.

The instant application is intended to overcome certain of the objectionable features of the prior art tablet handling machines and also provide the means by which compartmented containers can be readily filled.

SUMMARY OF THE INVENTION

The invention accordingly concerns the provision of means to transform the in-line delivery of a tablet conveyor to a discharge oriented to conform with the pattern of compartmentation of the tablet container, particularly radially disposed compartments of so-called dial packs or similar tablet containers while at the same time minimizing the formation of dust and mitigating tablet breakage. In accordance with one embodiment and feature of this invention, a plurality of fixed conduits are provided through which the tablets are conveyed by gravity and wherein both the inlet and outlet ends or manifolds communicating with the conduits can be oriented into any desired configuration thereby adapting the arrangement to any type of tablet pick-up and conveyor system and a wide variety of compartmentation and tablet container designs. In one form the invention concerns means to transform in-line or parallel delivery of tablets to a linear manifold, as produced by the well known "slot" or cavity bar conveyor belt, to radial and oriented discharge conforming with a dial pack.

DESCRIPTION OF THE DRAWINGS

One embodiment of this invention is shown in the drawings illustrating a dial pack filler wherein:

FIG. 1 is a fragmentary perspective view of the front of the dial pack filler;

FIG. 1A is a diagrammatic view of the control box for the dial pack filler;

FIG. 2 is a fragmentary plan view partly in cross section of the manifold arrangement and filler head of the dial pack filler;

FIG. 2A is an end view of the tube manifold with the rotatable manifold or filler head removed;

FIG. 3 is a fragmentary side view of the manifold arrangement shown in FIG. 2;

FIG. 4 is a cross-sectional view taken along the lines 4—4 of FIG. 2 with the outer support bracket removed;

FIG. 5 is a cross-sectional view taken along the lines 5—5 of FIG. 4 to show the flexible vanes within the filler head;

FIG. 6 is a fragmentary plan view partly in phantom to show the rotation ring and support collar for the filler head;

FIG. 7 is a cross-sectional view of the outer support bracket taken along the lines 7—7 of FIG. 6 with the rotatable manifold in place;

FIG. 8 is a plan view of the rotation ring;

FIG. 9 is a side view of the rotation ring;

FIG 10 is a fragmentary perspective view of the front of the dial pack filler in operation;

FIG. 10A is a fragmentary top view of the tube manifold with the upper manifold removed;

FIG. 11 is a circuit diagram of the electric control components;

FIG. 12 is a perspective view of a modified manifold adapted to fill a six-compartmented rectilinear capsule or pill box;

FIG. 13 is a bottom plan view of the embodiment shown in FIG. 12;

FIG. 14 is a bottom plan view of the fixed manifold to be used with the modified manifold of FIGS. 12 and 13;

FIG. 15 is an end view of the fixed manifold shown in FIG. 14; and

FIG. 16 represents a rectilinear capsule or pill box to be filled in one embodiment of this invention.

THE PREFERRED EMBODIMENT

Referring to the drawings, particularly FIGS. 1 and 10, there is disclosed one embodiment of this invention comprising a pill box filler having a table 10 supporting the housing 12 in the top portion of which the conveyor belt 14 operates to deliver tablets (not shown) from a hopper (not shown) above and behind the housing 12. The conveyor belt 14 is comprised of a number of interconnected and articulated cavity bars or so-called slats 16, in banks, each slat having an elongated slot 18 adapted to receive a tablet in a recess or hole in the bottom wall thereof from the hopper and convey same to the point of ejection into the top of the upper manifold 20.

The conveyor belt 14 is illustrative of the type of conveyor designed to give in-line delivery of a plurality of tablets for simultaneous release to gravity flow at the point of ejection or discharge. To illustrate, a conveyor of this type is constructed of thirty slats, arranged in banks, having their elongated axes substantially horizontal except on discharge and carried one after the other on suitable drive chains (not shown) carried by sprockets inside the housing 22. The sprockets are carried on front and rear horizontal axes. A fixed number of slats 16 must be in the machine at all times to prevent tablets from the hopper from falling inside the machine. The slats have end holes which fit on pins carried by the slat chains. The slats can have different numbers of slots 18 and some can be without any slots depending on the discharge desired. The number of slats comprising a bank, a portion of which is shown, must be a factor of 30, in the machine illustrated, i.e., 2, 3, 5, 6, 10 or 15 and all banks must have the same number of slats. The slats are made of a suitable plastic such as modified acrylic. The hopper is equipped with a vibrator, not shown, to assure even and certain distribution of the tablets at the hopper outlet which is at the inlet end of the conveyor 14. As each bank of slats 16 passes the point or position shown in FIG. 1, it drops a prescribed number of tablets into the upper manifold 20 and stops until the product has had time to pass through the manifold.

The upper manifold 20 comprises a predetermined number of elongated passageways 26 defined between spaced movable partitions or dividers 28, formed of a suitable plastic and covered with a transparent outside wall plate 30. The upper manifold 20 has the side walls 32 and is supported upon the tube manifold 34 held to the housing 22 by means of the side brackets 34 by means of the thumb screws 36 (see also FIG. 10). The tube manifold 34 (see FIGS. 2 and 10A) comprises a series of fifteen plastic couplings 40 having rectangular top openings 42 and smaller rectangular bottom openings 44 defined at either end of the tapered or pyrimidal enclosing wall 46. The couplings 40 are held in continuous relationship side-to-side along the inside of the housing 48 as by means of the wedge-shaped members 49. The assembly is held together within the housing 48 by means of the end walls 50 and the detachable cover plate 51. The top openings 42 of each coupling 40 are in open communication with the bottoms of the adjacent passageways 26 of the upper manifold 20. The lower end of each coupling is cemented to a fixed plastic tube 52. The fifteen tubes 52 are accordingly in open communication with the respective couplings to the passageways 26. The tubes have inner bores 53 of the same configuration (oblong or square) as the outlets 44. The bores 53 extend the length of the tubes 52. The assembly of fixed tubes 52 will be referred to as the tube manifold 54.

The lower ends 58 of the tubes 52 of the tube manifold 54 are solvent cemented into the lower manifold 60 (FIGS. 2 and 2A) comprising a plastic ring 61 with a series of radially spaced, inwardly directed, wedge-shaped walls 62 forming compartments to receive the tube ends 58. The walls 62 are in the same plane as the bottom edge 64 of the lower manifold 60 and are affixed at their inner vertical edges to or integral with the collar member 66 having a central hub member 68 with a threaded bore hole 70 therein. The bottom of the hub 68 is recessed from the bottom 64 as shown in FIG. 2. The bottom surface has a series of spaced intersecting slots 71 formed between the walls 62 and the tubes 52. The rigid tube manifold 54 holds the lower manifold 60 in a fixed position spaced from the table 10.

In one embodiment of this invention means are provided to permit the discharge of tablets through the lower manifold 60 and at the same time orient the tablets radially over the compartments of a dial pack 72 (see FIG. 10) having a number of radially disposed compartments 74 formed between the radial walls 76 held together by the inner hub 78. Each dial pack is formed of a suitable plastic and is shown with its circular top or cover removed, ready for filling. The particular dial packs shown have thirty such compartments of equal size with one section 80 which has a top closure or is solid so as to not receive a tablet. Consequently, the arrangement of the tube manifold 54 within the lower manifold 60 conforms with every other compartment in the dial pack to be filled, there being only fifteen tubes 52. The lower manifold has a larger wedge-shaped spacer wall 82 which is oriented over the section 80 of the dial packs in a manner to be described. The wedge 82 is on the inner or center-most part of the lower manifold 60.

The aforementioned means to radially orient the discharge from the lower manifold 60 to the alternate compartments 74 of the dial packs 72 comprises the rotation manifold 84 supported within the stationary rotation ring bracket 86 which has a rearward portion 88 affixed to the frame member 90 by means of the adjusting bolts 92 (FIGS. 1 and 10). Referring to FIGS. 6 and 7 the rotation ring bracket 86 has a recess 94 in the rear portion 88 and a side bore forming a support for the two way air cylinder 98, suitably supported through the side wall of the bracket. The recess 94 is open at the top side and has the side opening 100 in communication with the enlarged bore 102 provided within the bracket 86. The bottom of the bore 102 has the radial flange 104 which functions as a seat for the bronze ring bearing 106. Between the top surface 108 of the ring bracket 86 and the top of the ring bearing 106 there is a space 110.

At the front of the bracket 86 the space 110 is enlarged as indicated at 112 to form a recess. The wall of the bracket 86 has a pair of threaded bore holes 114 extending at an angle therein to the recess 112. Each bore hole carries an adjusting screw 116, the head end of which is extendable into the recess 112.

The rotatiton manifold 84 carries the radial, circumferential flange 118 spaced from the flat bottom surface 120. The flange 118 is proferably made of a tough plastic material such as a polyamide or an acetal resin or the equivalent and is affixed to the manifold 84 by an adhesive at the juncture 122. The flange 118 is affixed to the rotation ring 124 by means of the pair of screws 126 engaging suitable aligned threaded bore holes 127 (FIG. 8) in the top of the radial flange 128 of the rotation ring 124.

As shown in FIGS. 8 and 9, the rotation ring 124 has the internal bore 130 adapted to fit snugly over the rotatiton manifold 84 and is provided with the radial lug member 132 on one side and the radial yoke member 134 on the opposite side. The yoke member 134 has the elongated slot 136 within and through its extended end. In the assembled position of these parts as shown in FIGS. 6 and 7, it is seen that the flange 118 and the rotation ring 124 are held together as a unit with the rotation manifold 84 by means of the screws 126, the lug member 132 is positioned within the recess 112 of the bracket 86 while the yoke member 134 extends radially within the opening 100. The rotation bracket carries the two-way air cylinder 98 in the opening 96 of the side wall 139 as by means of the lock nut 140 so that the double-acting plunger rod 141 extends into the space 94 in an adjustable manner whereby the pin 142 engages the slot 136 of the yoke member 134. By this arrangement the application of air pressure on either side of the piston (not shown) of the air cylinder 98, moves the yoke 134 back and forth and turns the rotation manifold 84 on the bearing 106 within the limits of the lug 132 as accurately controlled by the set screws 114. The air hoses 145 and 145', FIGS. 1 and 10, are provided to control the air flow to the cylinder 98 in a manner to be described.

As one embodiment of this invention (see FIGS. 4 and 5) the rotation manifold 84 has a plurality of radially disposed passages 150 defined between upright flexible fins 152 which extend in radially disposed pairs on each side of interconnected base or wall members 154 held between the outer wall 156 and the inner wall 158, concentric to each other. These parts can be solvent-cemented together or molded as an integral unit. The wall members 154 can be formed by an epoxy filler in assembly of this unit. The outer edges 160 (FIG. 5) and inner edges 162 of each fin 152 are spaced from the inner and outer surfaces, respectively, of the wall members 156 and 158 over a substantial portion of the lengths of the fins. Each fin 152 is the same length and their top edges 164 lie in substantially the same plane above the top peripheral edge 166 of the wall 156. The top edge 168 of the inner wall 158 is slightly higher than the edge 166 of the wall 156 but lower than the edges 164 of the fins. Thus, the ends of all of the fins protrude above the top of the rotation manifold.

The rotation manifold 84 has an inner hub member 170 with the central bore 172 and a bolt or stud 174 (FIG. 2) is provided which engages therethrough into the threaded bore 70 of the center hub 68 to hold the assembly in rotational relationship within the lower manifold. The protruding top coplanar edges 164 of the fins 152 extend into the recesses 71 formed on each side of the wedge-shaped walls 62 of the lower stationary manifold 60. One base or wall member 176 of the rotation manifold is larger than the others. The unit is assembled with the wider base 176 on the inside so it registers with the wedge-shaped wall 82 of the lower manifold 60. Thus, each passageway 53 of the rigid tubes is aligned with the passages 150 of the rotation manifold 84. In this manner, the discharge of fifteen tablets into the tubes 52 causes their orientation into the radial configuration of the passageways 53 of the lower manifold 60, and thence into the passages 150 between the fins 152 of the rotation manifold 84 and into every other or alternate compartments 74 of a dial 72 held thereunder. The rotation manifold 84 rotates within the bracket 86 as previously described and the bolt 174 and the hub 68 are stationary. The flexing of the fins, held stationary at their top edges 166 in the recesses 71 allows this rotation.

The device includes means to progressively move empty dial packs 72 into registry with and slightly spaced from the lower end or edge 120 (see FIG. 7) of the rotation manifold 84. For this purpose the table 10 supports the shaft 182 which carries the turntable 184 within the circular recess 186 in the top of the table. Preferably, the top surface of the turntable 184 is substantially flush with the top surface of the table 10 (FIG. 10). The turntable has a plurality of circular recesses or cups 188, radially positioned and circumferentially spaced therein, in which the dial packs are retained with their top surfaces extending above the top surface of the turntable 184 while still clearing the lower edge 120 of the rotation manifold. Each cup 188 has a pair of diametrically disposed indentations 190 in the side wall to receive the pins 191 which engage slots in the dial packs to hold same with their spacer sections 80 on the inside as illustrated in FIG. 10. The direction of rotation of the turntable 184 can be either clockwise or counterclockwise. The operator continuously places an empty dial pack into the cup from which he has removed a filled dial pack as the turntable 184 rotates under the rotation ring bracket 86. Means (not shown) such as a ratchet, escapement, intermittent motion cams, a wheel or a Geneva swinging gear section all well known in the art, are provided to rotate or index the turntable 184 intermittently with each movement placing a dial pack 72 under the rotation manifold 84 for delivery of thirty tablets therein in two discharges of the device. Each dial pack is moved into its position below the rotation manifold 84 and the mechanism pauses while the cavity bar conveyor belt 14 releases a first discharge of fifteen tablets. The cycles or pauses are timed so that the tablets can fall through the tubular manifold 52 and into alternate compartments 74 of the dial pack being filled. The air cylinder then moves, extends or retracts as desired, and rotates the rotation manifold 84 over the remaining compartments 74 of the dial pack. In this instance, the angular rotation is about 12° as controlled by the stop limit screws 116. The cavity bar conveyor belt 14 then releases the second discharge of fifteen tablets. The turntable 184 then rotates sufficiently to place the next dial pack in position for filling.

On each cycle the air cylinder 98 can operate to rotate the rotation manifold 84 from a first cycle position to a second cycle position and return to repeat this performance for the next dial pack. Alternatively, the air cylinder 98 can be operated with no return cycle between each filling of a dial pack, i.e., operate through a first and second cycle filling for one dial pack then operate through a second cycle filling to a first cycle filling for the next dial pack, if desired. This reduces the number of operations per filling of the air cylinder 98. The parts and their relationship thus far described constitute one embodiment of this invention.

Referring to FIG. 10, a vibrator 194 is provided with an adjustable head 196 carried by the bracket 198 and operating upon the table top 10 to vibrate the assembly and prevent the tablets from sticking in the passageways. This arrangement may be necessary for certain kinds or shapes of tablets or capsules. A vibrator can also be affixed to the hopper to aid the even delivery of the tablets to the cavity bar conveyor belt 4. The device can be operated from any suitable source of power and a combination of electrical and compressed air or hydraulic power can be used.

Referring to FIG. 11, the primary control components will be described. The circuit is divided into parts A and B, interconnected with C through suitable plug sockets as indicated. The circuit A comprises the components necessary to control the rotation of the turntable 184 and the operation of the air cylinder 98 in reciprocating the rotation manifold 84. The mechanical, electromechanical and hydraulic means to accomplish these results being known in the art and omitted from the diagram. The circuit B includes components controlling the tablet delivery and tablet counting. Circuit C contains the motor drive and count microswitch.

Both circuits A and B are powered by a source of 115 v., 60-cycle, single phase current 200 through the power lines 202 and 204 controlled by the toggle switches 206 and 208 which conveniently are located at the front of the table 10. The "ON" position of the switches 206–208 is indicated by the red pilot light 210. The vane switch 212, located in the auxiliary hopper is actuated by the presence of a certain level of tablets therein and its "ON" position is indicated by the second red pilot light 214.

Briefly, the component parts of the circuit A are the main toggle switch 216 (double pole), located on the front of table 10, one pole of which connects from the hot line 217 through the line 218 through the multi-contact latching relay 222 to the counting circuit B through the line 224. The latching relay 222 is further controlled by the microswitch 226 which is activated by the turntable 184 and is located beneath the table 10. The circuit A in addition includes the "Hand"-"Automatic" toggle switch 228 controlling the turntable solenoid valve 230. The contact 232 of the latching relay 220 connects between the switch 216 and the rotation manifold solenoid valve 234. The contact 236 of the relay 222 connects to the contact 238 of the latching relay 220 controlling the latch solenoid 240 in one position and the release solenoid 242 in the other position. The relay 222 has the time delay instantaneous contact 244 connected to the counter circuit B by the line 246 and to the time delayed contacts 248 of the relay 222. The contacts 238 and 248 are interconnected by the line 247 and one side of the delay contacts are connected to the latching delay contacts 250 controlling in one position the release solenoid 252 and the latching solenoid 254 in another position. The time delay solenoid 256 completes the circuit via the line 258 to one side of the counter 260 of the circuit B.

The circuit B includes the right foot switch 261 of the momentary contact type connected to one side of the counter 260 having the clutch coil 262 and the count coil 264, the former receiving power through the line 217 when the switch is closed and the latter receiving power through the line 206. The counter has the instantaneous contacts 266 and the delay contacts 268 and 270 interconnecting to the control relay 271, the ready-to-count pilot light 272, and the counting pilot light 274 back to the power source as indicated, with one side of the delayed contacts 270 connected to the line 246, via the line 275 and the other side to the line 265 within the relay system.

The line 276 connects to one side of the toggle switches, 277, 278 and 279 back to the power source and each is controlled by a suitable rheostat, i.e., 280, through the plug sockets to the side vibrator, solenoid 281, the ejector vibrator solenoid 282 and the solenoid 283 of the table vibrator 194, controlled by the switch 284.

The circuit additionally includes the count microswitch 285, the hopper level mercury switch 286 and the auxiliary hopper feeder vibrator 288, under the control of one terminal of the toggle switch 279. The drive motor for the counter is indicated at 290 under the control of the motor starter control relay 292 and the solenoid for the clutch driving the counter is indicated at 294. The balance of the circuit B can include optional rectifiers, rectifiers and transformers as indicated with the left foot switch 296, of the maintained contact type to control the motor. The external controls of the counter are shown in FIG. 1A in an illustrative arrangement on the control box 300.

With a supply of tablets in the hoppers, unfilled dial packs in the exposed recesses 188 of the turntable 184 and a supply of unfilled dial packs available, the operator closes the switch 206–208. The pilot lights 210 and 214 light, the drive motor 290 turns and at the same time the clutch 294 disengages, since the left foot switch 296 is of the maintained contact type. The toggle switches 277, 278 and 279 are closed and the side vibrator 281 and the ejector vibrator 282 are adjusted to the desired frequency by the rheostats. There being an adequate supply of tablets in the auxiliary hopper, the switch 286 is closed and the feed vibrator 288 is operating.

The first dial pack is moved into position under the manifold 84 by pulsing the switch 228 to "hand" position, releasing the solenoid 230. Once in position the turntable stops because the switch 228 is in "auto" position.

The switch 216 is now closed by the operator and the latching relay 222 takes over the control of the steps of advancing a bank of slats 14, counting, rotation of the manifold 84, advance of a slat, counting retraction of the manifold to complete a dial pack and then rotate the table to the next dial pack. The advancing of a slat and counting step take place simultaneously through the microswitch 285 operated by the chain drive within the top housing. Each time the clutch coil 294 is energized and the clutch engages, the motor 290 turns the turntable 184 to the next station. The turntable closes the switch 226. This causes the simultaneous advance of a slat, the actuation of the counter 260 and the closing of the latching relay 238, holding the manifold 84 in a first position. This allows the tablets to fall into position within the dial pack filling alternate compartments. Then the latching relay 238 opens and the time delay 248 allows the release of the solenoid operating the rotation manifold, which turns or extends the rod 141 to the second position of the manifold. This also pulses the clutch 294 and the drive motor 290 carries another bank of slats forward to feed the alternate compartments in the dial pack. The count microswitch 285 is tripped, the counter 260 cycles to count-out position, lighting the ready to count pilot light 272. At count-out position the counter energizes the time delay 256 and simultaneously the turntable is released to rotate to the next station, the slats deliver fifteen tablets to the next dial pack and the cycle is repeated.

It is to be observed that the machine can be made to operate so that the advance of a slat to feed tablets occurs either before, after or simultaneously with the rotation of the table. Each time the count microswitch is closed the clutch 294 disengages and the clutch coil 262 is engaged to advance the counter 15 units. This opens the delay contacts 270 and stops the counter.

The pulse from the counter goes through the line 258 to the time delay relay 248 to close the upper contacts of the time delay 248 and also the contacts 238, so power is cut off to the release relay 242. This allows the turntable to rotate again, to close the switch 226 and again energize the counter and also the relay 271 which pulls in the clutch 262 and starts the advance of the counter. The slats again advance one stage, trigger the counter through the microswitch 285 to count-out position etc.

It is apparent from the foregoing description that the machine of this invention can have the tube manifold 54 arranged in any desired configuration and that the rotary feed of the table 184 can be in-line or belt feed in order to accommodate tablet containers of different configuration. The dial packs 72 can be fed to the machine by any means including hand feeding and in-line belt feeding, each with the required intermittent action to pause long enough for the machine to cycle. Also the manifold 84 can be made to reciprocate instead of rotate.

In this connection the manifold 84' can be rectilinear as shown in FIG. 12, and provided with a base 302 with the spaced upstanding divided walls 304 extending therefrom. The base supports at its ends the flexible fins 306 so that they are spaced slightly from the inside of the walls 304 coadjacent thereto as indicated at 308 and can flex inwardly and outwardly in the passageways 310. In FIG. 13, bottom view, the relationship of the parts is shown more clearly. The bottom surface 312 of the manifold 84' corresponds to the bottom surface 120 of the manifold 84. Each of the fins 306 extends about one third of its length above the top edges of the walls 304.

The modified manifold 84' shown in FIGS. 12 and 13 is adapted to be used with the modified lower fixed manifold 60' shown in FIGS. 14 and 15 comprising a series of spaced parallel walls 314 extending downwardly from the base 316 having the passageways 318. The tubes 52 in this instance are attached in an in-line position to the top surface 320 of the base 316. The passageways 318 are further defined by the end walls 322 which are provided with the slots 324. In assembled position the walls 314 are aligned with the walls 304 of the manifold 84' so that the passageways 318 communicate with the passageways 310 with the extended ends of the fins 306 fitting into the corresponding slots 324. The slots 324 are deep enough to slideably receive the ends of the fins and such that the fins will not disengage therefrom on flexing as the manifold 84' is moved laterally, by suitable means, such as the cylinder 98, across the line of travel of a pill box such as shown in FIG. 16. In the assembled condition the modified manifold 84' is mounted in a modified bracket 86 for such reciprocation, instead of rotation, and the tip ends of the fins 306 oscillate or reciprocate vertically in the slots 324. The extended edge walls 304 and 314 are spaced slightly from each other although they may become a bearing surface, as desired.

The pill box 330 as shown in FIG. 16 has a hinged cover 332 which opens out into a flat position so as to be out of the way during filling and can be removable. The box 330 has a capacity of six tablets or capsules within the compartments 334. During the filling operation in this embodiment the boxes 330 can be moved into registry with the manifold 60' by use of a turntable 184 having suitable shaped recesses to engage the boxes properly or they can be so moved by an in-line belt or rubber chain conveyor, as desired. The manifold 84' is suitably supported in a modified support 86 (not illustrated) so that the manifold can reciprocate radially with the turntable or perpendicular to the line of travel of the belt conveyor replacing the table. In order that the fins 306 do not have to flex all in one direction, the filling operation can be coordinated such that the manifold 84' moves from an intermediate point of non-registry, outwardly to fill the outermost compartments 334 of the pill box 330 and then moves inwardly to registry with the innermost compartments 334. Although the pill box 330 has a capacity of six tablets or capsules, this is for illustration only and the manifold arrangement can be provided with multiple passageways 310 and 318 to accommodate any desired size of pill box.

The invention accordingly is directed to a machine for filling multiple compartments of a container with individual objects from a continuous supply including any means to deliver the objects from the supply to a drop point, a tubed manifold having a plurality of oriented tubes communicating at one end with the dropping points and at the other ends being arranged in any configuration which registers with the compartments of the container to be filled. Means are provided to move the containers into a fill position with the empty compartments in registry with the open lower ends of the tubed manifold and move filled containers from the fill position, with means to time the movements in sequence with the dropping of the tablets and the number of filling cycles per container required. Each release of objects can be a number less than and a multiple of the capacity of the container to be filled; and each fill position can accommodate the tablets of one release or a multiple. The cycles of dropping objects or tablets, rotation or reciprocation of the table 184, counting manipulation of the manifold 84, whether circular or rectangular are sequential or substantially simultaneous as desired, as long as a pause is provided to allow the objects to drop to the container, between appropriate cycles.

The various parts of the feed and manifold system described herein can be constructed of metal and as indicated, plastics can be used for some of the manifold parts. The tubes 52 can be made of any suitable sized plastic, such as cellulose acetate butyrate. The other plastic parts can be made of cellulose acetate or equivalent material. The bearing 106 can be Phosphor bronze or similar bearing material for long life and smooth operation.

What is claimed is:

1. A machine for filling multiple compartments of a container with individual objects from a continuous supply comprising:
    (a) means to deliver said objects from said supply to a drop point;
    (b) a tubed manifold comprising a plurality of oriented tubes communicating at one end with said dropping points;
    (c) the other ends of said tubes being arranged in a configuration registering with compartments of said container; and
    (d) means to move containers into a fill position with compartments thereof in registry with the open ends of said tubed manifold and move filled containers from said fill position, said movements being in timed sequence with said delivery means.

2. A machine for filling multiple compartments of a container with individual objects from a continuous supply comprising:
    (a) means to deliver said objects from said supply to a drop point; said delivery means releasing a number of said objects substantially simultaneously to said drop point, said number being less than and a multiple of the capacity of said container;
    (b) a tubed manifold comprising a plurality of oriented tubes communicating at one end with said dropping points;
    (c) the other ends of said tubes being arranged in a configuration registering with compartments of said container;
    (d) said other ends of said tubes communicating with a movable manifold;
    (e) means are provided to move said manifold from a first fill position to a subsequent fill position to accommodate multiples of said objects; and
    (f) means to move containers into a fill position with compartments thereof in registry with the open ends of said tubed manifold and move filled containers from said fill position, said movements being in timed sequence with said delivery means.

3. A filling machine in accordance with claim 2 in which:
    (a) flexible coupling means are provided between said tubed manifold and said movable manifold.

4. A machine in accordance with claim 1 including:
    (a) means to time the sequential movement of a container into the fill position in intervals of sufficient length to allow said objects to pass through said tubed manifold and into the compartments of said container.

5. A machine in accordance with claim 2 adapted to fill tablet containers having a plurality of radially disposed, circumferentially spaced compartments wherein:
    (a) said movable manifold has radially disposed and circumferentially spaced openings to register with a portion of said compartments of said container while in a fill position;
    (b) flexible coupling means are provided between the openings of said movable manifold and the tubes of said tubed manifold; and
    (c) means are provided to sequentially move said manifold radially to and from said fill positions.

6. A machine in accordance with claim 5 in which:
    (a) said movable manifold is rotatably supported on an axis common with said container in fill position; and
    (b) said tubed manifold is fixed.

7. A machine in accordance with claim 5 in which:
    (a) said flexible coupling means comprises a pair of spaced elongated fins extending from the sides of each of said openings in said manifold and defining passageways from said tubed manifold to the compartments of said container.

8. A filling machine in accordance with claim 7 in which:
    (a) said movable manifold is provided with an annular space having a series of radial walls at the bottom;
    (b) said fins are radially disposed and circumferentially spaced and extend from said radial walls defining the sides of said passageways therebetween within said annular space;
    (c) the bottom ends of said fins being fixed and the edges being spaced from the sides of said annular space;
    (d) the top edges of said fins terminating in substantially coplanar relationship above said annular space;

(e) said tubed manifold having a plurality of radially disposed and circumferentially spaced passageways;
(f) said tubed manifold having a plurality of recesses on the underside, engageable with the top free ends of said fins;
(g) and means to rotate said rotation manifold in relation to a tablet container whereby to register the passageways therein with a number of said compartments of a tablet container in a first fill position and the remaining compartments in a second fill position.

9. A filling machine in accordance with claim 8 including:
(a) an index table adapted to receive a tablet container, rotate same into and out of said filling positions.

10. A filling machine in accordance with claim 9 in which:
(a) said table comprises a plate rotatably mounted on an axis offset from said rotation manifold;
(b) said plate having an off-center recess therein adapted to receive a tablet container and retain same in oriented position;
(c) and means to intermittently rotate said plate to bring said recess under said rotation manifold.

11. A machine for filling multiple compartments of a container with individual objects from a continuous supply comprising:
(a) means to deliver said objects from said supply to a drop point;
(b) a tubed manifold comprising a plurality of oriented tubes communicating at one end with said dropping points;
(c) a movable manifold having flexible walled passageways communicating with the said other ends of said tubes of said tubed manifold, said passageways being arranged in a configuration registering with a multiple of the compartments of said container in a first position;
(d) means to convey a series of said containers to a fill position with said movable manifold;
(e) means to release a multiple of said objects from said dropping point into said tubed manifold;
(f) means to move said movable manifold whereby said passageways register with a multiple of the compartments of said container;
(g) means to individually actuate said delivery means, said movable manifold and said conveyor means intermittently; and
(h) means to control said actuation means in sequence whereby a container is moved to a fill position under said movable manifold, said delivery means releases a multiple of said objects to fill a compartment of said container, said manifold is moved from said first position to a subsequent position, said delivery means releases another multiple of said objects and said container is moved from said fill positions.

12. A machine in accordance with claim 11 in which:
(a) said passageways of said movable manifold are in a linear configuration; and are adapted to deposit objects into a container having substantially parallel rectilinear compartments each holding a multiple of said objects.

13. A machine in accordance with claim 12 in which:
(a) said passageways of said movable manifold are in a circular configuration and are adapted to deposit objects into alternate individual compartments of a circular container in said fill positions.

14. A machine in accordance with claim 12 in which:
(a) said tubed manifold is fixed and has a plurality of radially disposed recesses on the under side, said recesses being in pairs on each side of said oriented tubes;
(b) said movable manifold is rotatably supported within a fixed collar bracket and is provided with an upwardly facing annular space defined by concentric walls with a series of spaced radial walls at the bottom transverse said annular space, the space between adjacent pairs of said walls being in open communication with said annular space;
(c) said radial walls extending upwardly within said annular space as resilient fins;
(d) the top edges of said fins engaging said recesses in said tubed manifold;
(e) means within said collar to adjustably limit the rotation of said movable manifold therein; and
(f) double-acting piston means connected to said movable manifold to rotate same within said collar to register with said fill positions.

15. A machine in accordance with claim 11 in which:
(a) said delivery means comprises a driven belt having a plurality of grooved slats arranged in banks adapted to pick up said objects from said supply and release said objects substantially simultaneously at said dropping point; and
(b) means actuated by said belt to record the passage of each bank of said belt whereby a count of the number of said objects delivered to said tubed manifold is obtained.

16. A machine in accordance with claim 11 in which said means to control said actuation means comprises:
(a) a latching and release circuit for said container conveyor;
(b) a latching and release circuit for said movable manifold; and
(c) means to time the sequential latching and releasing of said conveyor and movable manifold sufficient to allow said objects to drop through said manifold.

References Cited
UNITED STATES PATENTS

| | | | |
|---|---|---|---|
| 3,139,713 | 7/1964 | Merrill et al. | 53—78 X |
| 3,354,607 | 11/1967 | Lakso | 53—78 |

TRAVIS S. McGEHEE, Primary Examiner

U.S. Cl. X.R.
53—166, 246